W. E. WRIGHT.
Improvement in Driers.
No. 129,775. Patented July 23, 1872.
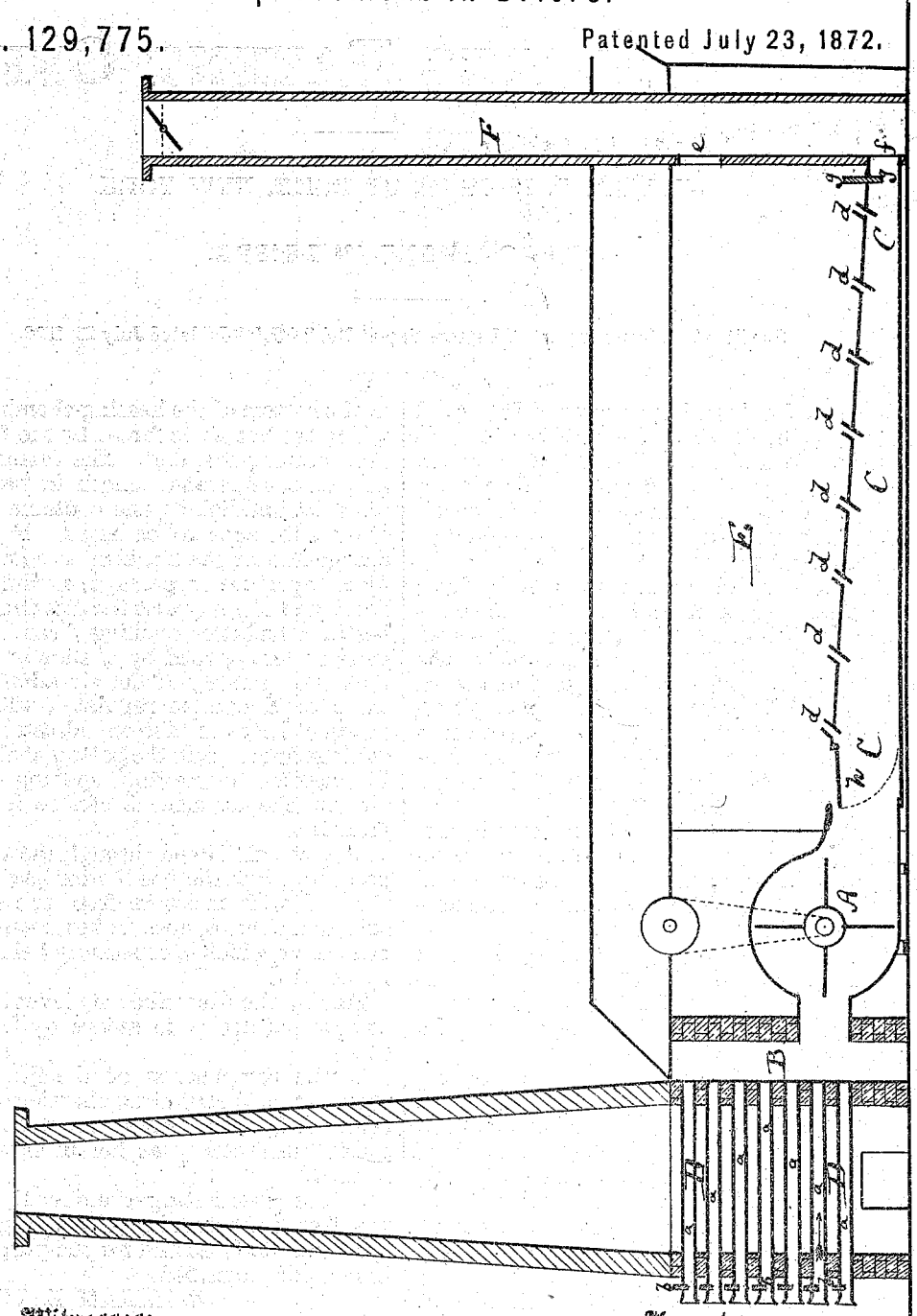

UNITED STATES PATENT OFFICE.

WILLIAM E. WRIGHT, OF ROME, NEW YORK.

IMPROVEMENT IN DRIERS.

Specification forming part of Letters Patent No. 129,775, dated July 23, 1872.

Specification describing a new and Improved Apparatus for Drying Peat, Lumber, &c., invented by WILLIAM E. WRIGHT, of Rome, in the county of Oneida and State of New York.

The drawing represents a vertical longitudinal section of my improved apparatus for drying peat, lumber, &c.

This invention relates to a new means of drying substances (more particularly those mentioned in the title hereto) by currents of heated air forced through a chamber that contains the matter to be dried, and ejected therefrom when charged with the moisture taken from such matter. By this arrangement the peat or other substance whatsoever is exposed to the identical effect of hot wind and will be thoroughly and rapidly dried.

The heating devices now in use mostly consist of chambers, whence the heated air therein generated or applied cannot escape, and wherein all moisture is consequently detained—a process evidently irrational.

My invention consists, more particularly, in the combination of a hot-air chamber and injector-fan with a distributing-chamber, heating-chamber, and escape-flue, whereby the principle above indicated is carried into effect.

A in the drawing represents a rotary fan, of suitable construction, placed between a hot-air chamber, B, and a distributing-chamber, C. The hot-air chamber is supplied from pipes *a a*, which extend through a furnace, D, and heat the air that passes through them by the fire beneath and about them. Valves *b b* are arranged in the pipes *a* to regulate the volume of air passing through them. The fan A conveys the air from the hot-air chamber B into the distributing-chamber C, which extends along and under the bottom of the heating-chamber E. There are a series of openings, *d d*, in the bottom of the heating-chamber, through which the hot air is forced by the fan into the said heating-chamber. The latter is preferably of considerable length in proportion to its width and height, and contains the peat or other substance to be dried. F is the discharge-flue for the hot air. It communicates, by an aperture or passage, *e*, with the chamber E, and also at *f* with the distributing-chamber C. The latter opening *f* can be closed or more or less opened by a slide or gate, *g*, so that the quantity of hot air admitted to the chamber E can be regulated with extreme nicety. There is also an adjustable gate, *h*, or hinged portion, in the bottom of the chamber E, whereby the entrance opening for the hot air into the chamber E can be increased at pleasure.

The hot air forced through the chamber E passes out into the flue F after having become charged with moisture from the contents of said chamber E, and makes room for fresh-heated air, which is constantly being supplied by the fan.

Having thus described my invention, I claim as new and desire to secure by Letters Patent—

1. The combination of the fan A, hot-air chamber B, distributing-chamber C, heating-chamber E, and hot-air escape-flue F with each other, substantially as herein shown and described.

2. The distributing-chamber C, when provided with the openings *d d* and gates *g* and *h*, substantially as and for the purpose herein shown and described.

WILLIAM E. WRIGHT.

Witnesses:
T. B. MOSHER,
W. A. GRAHAM.